United States Patent [19]

Allcock et al.

[11] 4,440,921

[45] Apr. 3, 1984

[54] COUPLING OF POLYORGANOPHOSPHAZENES TO CARBOXYLIC ACID

[75] Inventors: Harry R. Allcock; Thomas X. Neenan, both of State College; Walter C. Kossa, Wilkes-Barre, all of Pa.

[73] Assignee: Research Corporation, Tucson, Ariz.

[21] Appl. No.: 390,350

[22] Filed: Jun. 21, 1982

[51] Int. Cl.$^3$ .................... C08G 73/00; C08G 79/02
[52] U.S. Cl. .................................. 528/168; 525/417; 525/535; 525/538; 525/540; 528/167; 528/169; 528/228; 528/229; 528/367; 528/368; 528/369; 528/399
[58] Field of Search ............................... 528/167–169, 528/367, 368, 369, 399, 228, 229; 525/417, 540, 535, 538

[56] References Cited

U.S. PATENT DOCUMENTS

| 4,055,523 | 10/1977 | Dieck et al. | 528/168 |
| 4,130,547 | 12/1978 | Fieldhouse | 528/168 |
| 4,207,403 | 6/1980 | Cheng et al. | 528/168 |
| 4,218,557 | 8/1980 | Hergenrother et al. | 528/168 |
| 4,221,904 | 9/1980 | Hergenrother et al. | 528/168 |
| 4,223,102 | 9/1980 | Hergenrother et al. | 528/168 |
| 4,242,491 | 12/1980 | Hergenrother et al. | 528/168 |

Primary Examiner—Lester L. Lee
Attorney, Agent, or Firm—Scully, Scott, Murphy & Presser

[57] ABSTRACT

A carboxylated phosphazene polymer, comprising a phosphazene polymer backbone covalently coupled to a carboxylate-containing compound through a divalent organic radical attached at one end to the carboxylate by an amide bond formed at a primary aliphatic amino group of the radical and at the other end to a phosphorous of the phosphazene backbone.

32 Claims, No Drawings

COUPLING OF POLYORGANOPHOSPHAZENES TO CARBOXYLIC ACID

The invention described herein was made in the course of work under a grant from the National Institues of Health.

BACKGROUND OF THE INVENTION

1. Field of the Invention

This invention relates to compounds formed by linking molecules containing carboxylic acid functional groups to phosphazenes via condensation to side-group amino residues.

2. Description of the Prior Art

There has been considerable interest in the use of polyphosphazene polymers as carriers of bioactive molecules since the discovery that polyorganophosphazenes having amino acid side-groups decomposed hydrolytically to produce harmless products consisting of amino acids, phosphate, and urea. Polyorganophosphazenes also offer a wide choice of side-group structures that can impart water solubility hydrophilic or hydrophobic insolubility, or in special cases, biodegradability, to non-toxic molecules. Since many bioactive molecules contain carboxylic acid functional groups, the linkage of carboxylic acids to phosphazenes via condensation to side-groups amino residues is an appealing prospect.

Many aminophosphazenes, such as $[NP(NH_2)_2]_x$, $[NP(NH_2)(NHR)]_x$, and $[NP(NHR)_2]_x$, are known, both as cyclic trimers or tetramers and as high polymers, as is disclosed in Allcock, *Phosphorus-Nitrigen Compounds*, Academic Press, New York, 1972. p-Aminophenoxyphosphazenes have also been synthesized, as disclosed in Kober et al, *Inorg. Chem.*, 6, 394 (1967). However, all attempts to bring about coupling between aminophosphazenes such as these and carboxylic acids proved to be unsuccessful. Therefore, there still remains a need for a method of coupling carboxylic acids to phosphazene polymers.

SUMMARY OF THE INVENTION

Accordingly, it is an object of this invention to provide compounds and a method of synthesizing such compounds in which a biologically active molecule containing a carboxylic acid functional group is attached to a phosphazene polymer via condensation to an amino residue.

This and other objects of the invention as will hereinafter become more readily apparent have been accomplished by providing a carboxylated phosphazene polymer comprising a phosphazene polymer backbone covalently coupled to a carboxylate-containing compound through a divalent organic radical attached at one end to said carboxylate by an amide bond formed at a primary aliphatic amino group of said radical and at the other end to a phosphorous of said phosphazene backbone.

The invention also provides a method of synthesizing the carboxylated phosphazene polymer disclosed above.

DESCRIPTION OF THE PREFERRED EMBODIMENTS

Prior to the present invention no general method for producing phosphazene polymers linked to carboxylate-containing compounds through an amide bond existed. Although various amino-containing phosphazene polymers were known as is disclosed in the prior art section of this application, it was not possible to form an amide bond with any of these amino group. The present invention occurred as a result of the discovery that a successful coupling reaction could be carried out if the carboxylate compound was reacted with an organophosphazene having a primary aliphatic amino group in the organic side chain. The side group serves as a linking group, or spacer, which separates the aliphatic amino group from the polymer backbone and allows the condensation reaction to take place efficiently.

The key to the synthesis of the poly(organophosphazenes) of this invention is the use of a preformed, linear, high polymeric halogenophosphazene as a highly reactive intermediate for substitution reactions. A few organic polymers are prepared by the modification of preformed macromolecules (for instance, the formation of poly(vinyl alcohol) from poly(vinyl acetate), or the chloromethylation of polystyrene), but this method of synthesis cannot be applied generally because of the lower reactivity of most organic polymers and the well-known problems that result from chaincoiling in solution or from the deactivation induced by charge generation or nearby repeating units. This modification method, however, forms the main synthetic route to the polyorganophosphazenes.

The overall synthesis routes for poly(organophosphazenes) are shown in Scheme 1.

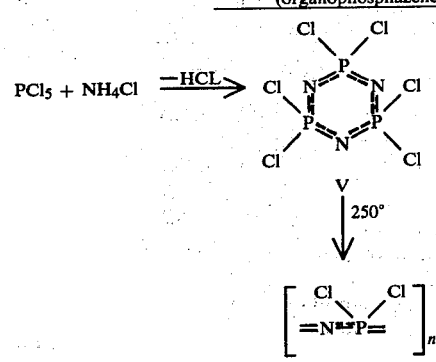

Scheme 1
General synthesis routes to poly-(organophosphazenes)

Scheme 1
General synthesis routes to poly-(organophosphazenes)

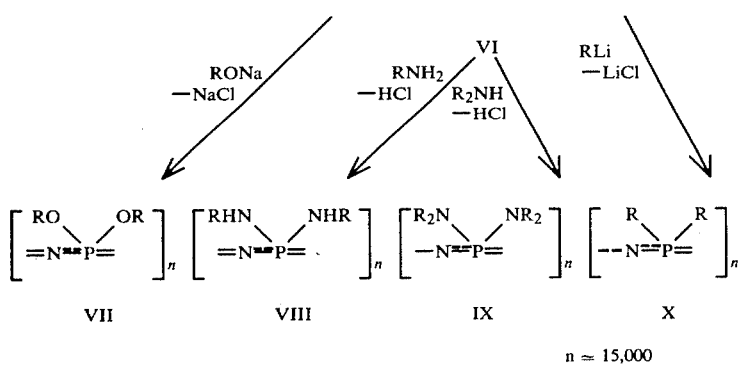

n ≈ 15,000

The formation of hexachlorocyclotriphosphazene (V) from phosphorus pentachloride and ammonium chloride or ammonia has been known since the work of Liebig and Wohler in 1834. Similarly, the thermal polymerization of V to a rubbery, crosslinked form of polydichlorophosphazene (VI) was reported by Stokes as early as 1897. However, for over 70 years this polymer was viewed merely as a laboratory curiosity because it is hydrolytically unstable in the atmosphere and is insoluble in all solvents. However, it has since been shown that the polymerization of V to VI is a two-step reaction. During the initial stages of the polymerization (up to 70–75% conversion of V to VI) an uncrosslinked form of VI is formed. This polymer is soluble in a number of organic solvents, such as benzene, toluene, or tetrahydrofuran. Beyond this stage, the polymer crosslinks rapidly. The mechanism of this crosslinking process is still not fully understood, although traces of water will accelerate the process, possibly by yielding P-O-P bridging links.

The formation of the uncrosslinked polydichlorophosphazene has been reported in various references and is not considered to be part of the present invention. This synthesis and the synthesis of various polymers therefrom, such as VI-IX, have been reported in, for example, Allcock and Kugel, *J. Am. Chem. Soc.*, 87, 4216 (1965); Allcock et al, *Inorg. Chem.*, 5, 1709 (1966); and Allcock and Kugel, *Inorg. Chem.*, 5, 1716 (1966), all of which are herein incorporated by reference.

In solution, the uncrosslinked form of VI is a highly reactive species. It reacts rapidly with alkoxides, amines, and some organometallic reagents to yield polymers, such as VII-X.

Investigators in the laboratories of the present inventors have recently developed a modification to this general synthesis route, specifically for the purpose of preparing polymers of structure, X. Polydichlorophosphazene (VI) reacts with organometallic species such as Grignard or organolithium reagents by two different reaction pathways—one favorable and one distinctly unfavorable. These two reactions are alkylation or arylation (XII) on the one hand, and chain-cleavage (XIII) on the other.

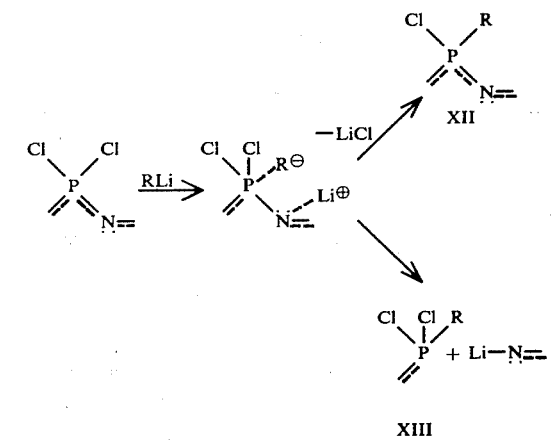

Because the chain cleavage reaction is presumably favored by a high electron-density in the lone-pair-electron orbital at skeletal nitrogen, the inventors have used the more electronegative fluorine atoms in poly(difluorophosphazene) to favor halogen substitution at the expense of chain cleavage. Poly(difluorophosphazene) (XV) can be prepared by the high pressure, high temperature polymerization of hexafluorocyclotriphosphazene (XIV). Once again this is a two-step process. In the first step the reaction mixture contains only a decreasing amount of XIV and an increasing proportion of uncrosslinked XV. In the second stage, XV crosslinks, often when the conversion of XIV to polymer has arisen above ~70%. The reactions of XV with organometallic reagents yield alkylated or arylated high molecular weight polymers, although 100% alkylation or arylation has not yet been achieved without appreciable chain cleavage.

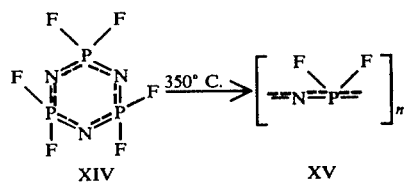

In polyphosphazene chemistry an enormous range of different polymers can be prepared by relatively simple techniques from one or two preformed polymeric starting materials. This means that the polymerization problem is a relatively trivial aspect of the synthesis. Different polymers are prepared from the same starting materials merely by modifying the side groups.

This unusual synthetic versatility can, in principle, give rise to an almost unprecedented range of new macromolecules. However, it is important to note that certain restrictions exist with respect to the types and combinations of different substituent groups that can be attached to the polyphosphazene chain.

First, the nucleophilic substitution reactions of poly(-dihalophosphazenes) generally fall into the category of $S_N2$-type replacements. Hence, they are affected by the nucleophilicity and steric characteristics of the attacking nucleophile and and by the leaving-group ability of the halogen. Second, restrictions exist when a prospective nucleophile possesses two or more potential nucleophilic sites. For example, a difunctional reagent (a diamine or diol) could crosslink the chains. Third, as mentioned previously, the possibility exists that the cleavage of phosphorus-nitrogen skeletal bonds might become competitive with phosphorus-halogen bond cleavage. A few examples will illustrate some of the specific restrictions that have bee identified.

The reactions of amines with poly(dihalophosphazenes) are, in general, more sensitive to mechanistic restrictions than are the substitutions by alkoxides or aryloxides. For example, diethylamine replaces only one chlorine per phosphorus in VI to yield polymers of structure, XVI.

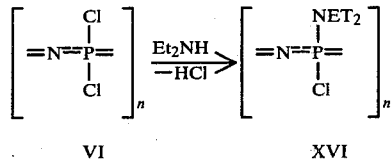

Diphenylamine apparently undergoes no substitution at all. These results reflect the sensitivity of the aminolysis reaction to steric effects and to the nucleophilicity of the amine. Moreover, if poly(difluorophosphazene) (XV) is used as a polymeric intermediate, even primary amines replace only one fluorine per phosphorus, under conditions where total halogen replacement occurs with polydichlorophosphazene. This effect is ascribed partly to the poor leaving-group ability of fluorine compared to chlorine. Steric effects are particularly

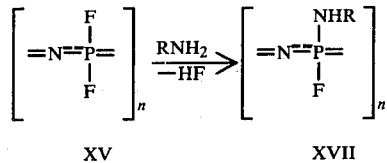

noticeable when bulky nucleophiles such as the steroidal anion shown in XIX are employed. Only one of these molecules can be introduced every three or four repeating units along the polymer chain, and some difficulty is encountered when attempts are made to replace the remaining halogen atoms by less hindered nucleophiles.

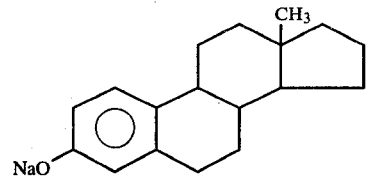

The crosslinking reactions by difunctional reagents are facile processes. Aliphatic or aromatic diamines or the alkoxides generated from diols readily crosslink the chains, either by halogen replacement or, in some cases, by the displacement of organic groups already present. Even ammonia or methylamine can function as crosslinkage agents. However, methylamine does not crosslink the chains at low temperatures, and ethylamine and higher alkyl or primary amines function exclusively as monorather than di-nucleophiles.

Perhaps the most serious restriction to the diversification of polyphosphazene structures is found in the tendency of many reagents to induce chain cleavage. The role of organometallic reagents in chain cleavage has already been mentioned. However, carboxylic acids and their alkali metal salts are particularly effective chain-cleavage agents. The mechanisms of these cleavage reactions are only partly understood. Nevertheless, this reaction pathway precludes the use of many biologically active agents as substituent groups unless special care is taken in attaching such radicals to the backbone.

The chemical characteristics of poly(organophosphazenes) can be understood in terms of two factors—the nature of the backbone and the structure of the side group. The chemistry of the backbone is dominated by the presence of the lone-pair electrons on the skeletal nitrogen atoms. The basicity of these nitrogen atoms facilitates protonation, coordination to metals, or hydrogen bonding to water or other protice solvents. For example, the polymer $[NP(NHCH_3)_2]_n$ forms acid-base "salts" with hydrohalides, functions as a polymeric ligand for transition metals such as platinum, and at the same time is soluble in water or alcohols.

An equally powerful influence on the chemical properties is exerted by the side group structure—sometimes in opposition to the skeletal influence. For example, although the $CH_3NH-$ side group confers water-solubility on the polymer, fluorinated side groups, such as $CF_3CH_2O-$ or $CF_3CF_2CH_2O-$, give rise to hydrophobicity and water-insolubility. However, these latter side groups provide solubility in ketones or fluorocarbons. The phenoxy group imparts solubility in hot, aromatic hydrocarbons, but insolubility in nearly all other media. Thus the hydrophobicity or hydrophilicity of a polymer can be varied over a wide range by a choice of suitable side groups.

The hydrolytic stability of a polyphosphazene is markedly dependent on the type of side group. Nearly all poly(organophosphazenes) are stable to aqueous media, but the most hydrophobic species are remarkably resistant to hydrolytic degradation. The polymers $[NP(OCH_2CF_3)_2]_n$ and $[NP(OC_6H_5)_2]_n$, are unaffected after years of immersion in strong aqueous sodium hydroxide solution. However, a limited number of side groups are hydrolytic destabilizing groups. For example, polymers that possess $—NH_2$ or $—NHCH_2COOR$ groups hydrolyze slowly with moisture.

Polymers according to the present invention may be synthesized as cyclic trimers using hexachlorocyclotriphosphazene, $(NPCl_2)_3$, as the starting material, or as linear polymers using polydichlorophosphazene, $(NPCl_2)_n$, as the starting material. The exact synthetic method will vary with the structure of the polymer being synthesized but will typically consist of two basic steps: reaction of the intermediate polyhalophosphazene with a molecule that will form the linking group either preceeding or followed by replacement of the remaining halogens with the inactive side groups.

Polymers may be synthesized containing only active side groups (i.e., side groups actively engaged in binding a carboxylate-containing compound through an amide bond if desired, but it is preferred to synthesize mixed polymers for ease of control of the physical properties of the polymers. Inactive side groups (i.e., those not having aliphatic amino group through which the amide bond is formed can be used to impart water solubility, water insolubility, or biodegradability as was previously discussed. When mixed polymers are synthesized, it is preferred to form the inactive side groups first since these generally contain fewer functional groups that may interfer with later reactions. This is essential if alkyl or aryl groups are attached directly to the phosphorous of the backbone because of the reactive organometallic reagents used to carry out this reaction. In general there are few limitations on the types of functional groups present in possible inactive side groups; the only prohibited functional groups are those in which a hydrogen is attached to a nitrogen, oxygen, or sulfur. Such functional groups can cause crosslinks to form with other polymer chains or cause undesirable chain cleavage if more than one such group is present at the stage of reacting the side-group precursor with the poly(dihalophosphazene). Examples of undesirable functional groups are hydroxyl, carboxylic acid, primary and secondary amino, thiol, and sulfonic acid groups. However, $-NH_2$ attached to the phosphorous of the backbone is acceptable. Preferred precursors of inactive side groups have the formula HQJ where Q represents $-NR-$ (R is hydrogen or methyl), $-O-$, or a covalent bond and J represents

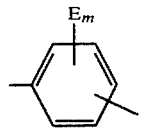

L, where L represents H, a $C_1$-$C_{12}$ alkyl group, or a $C_2$-$C_{12}$ alkyl group substituted by a halogen atoms or $-CN$ or interrupted by a divalent organic functional group of the formula $-O-$, $-COO-$, $-CONR^1$, $-R^1C=CR^1-$, $-C\equiv C-$,

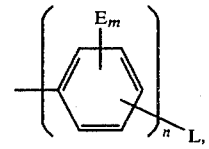

or $-CO-$, where each $R^1$ independently represents hydrogen or a $C_1$-$C_4$ alkyl group, m is an integer from 0 to 4, and each E independently represents a halogen atom, $-NO_2$, $-CN$, or $R^1$; or M, where M represents an aryl radical of the formula

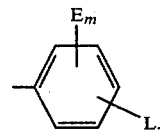

where n is 1 or 2, or

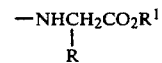

The substituents or divalent organic functional groups listed for the $C_1$-$C_{12}$ alkyl groups may independently appear more than once or more than one such substituent or functional group may be present.

Preferred inactive side groups have $-NH-$ or $-O-$ for Q and only halogen atoms or one or two divalent functional groups present in the remainder of the alkyl or aryl side group. Most preferred inactive side groups are $-N(CH_3)_2$, $$-NHCH_2CO_2R^1$$
$$|$$
$$R$$

where $R^2$ is the side chain of a naturally occuring amino acid,

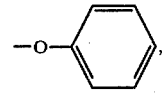

$-OCH_2CF_3$ and other fluorinated $C_2$-$C_4$ alkyl groups,

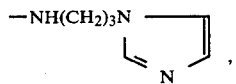

and $-NH_2$. Those inactive side groups (or later discussed linking groups) that can be prepared from commercially available reagents are especially preferred.

Replacement of chlorine atoms in the backbone of the polyhalophosphazene is carried out in an aprotic organic solvent, preferably an aromatic hydrocarbon such as toluene, by reacting the side group percurser HQJ; its salt GQJ, where G is an alkali metal ion; or the organometallic reagent UJ (where Q is to be a covalent covert bond), where U is a metal ion, with the polyhalophosphazene. The ratio of inactive to active side groups is easily controlled by controlling the mole ratio of percursor HQJ to replaceable halogen atoms. Suitable ratios include from 100:1 to 1:10. Preferred are ratios of 10:1 to 1:2 with about 3:1 being most preferred.

A trialkylamine may be used as a catalyst when the reaction is carried out with HQJ. Triethylamine is preferred.

The polyorganohalophosphazene intermediate is generally not isolated but is reacted with the small molecule that will form the linking group.

The divalent organic radical connecting the nitrogen that will form the amide bond to a phosphorus of the polymer backbone merely acts as a bridging group. Accordingly, its own internal structure is not critical, although there should be no functional groups present in this linking group which might interfere with the bonding of the carboxylate to the aliphatic amino group. Suitable divalent organic radicals which may serve as the linking group include radicals of the formula —AL— or —AM—, wherein A represents —O— or —NH—; L represents a divalent $C_2$-$C_{12}$ alkylene group or a divalent $C_2$-$C_{12}$ alkylene group substituted by a halogen atom or —CN or interrupted by a divalent organic functional group of the formula —O—, —COO—, —CONR—, —RC=CR—, —C≡C—,

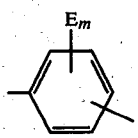

or —CO—, where each R independently represents hydrogen or a $C_1$-$C_4$ alkyl group, n is an integer from 0 to 4, and each E independently represents a halogen atoms, —$NO_2$, —CN, or —R; and M represents a divalent aryl radical of the formula

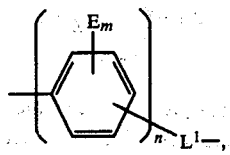

where n is 1 or 2, or

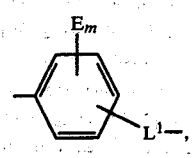

where $L^1$ is L or —$CH_2$—, and A is directly bonded to a phosphorous of said backbone while L or M is bonded to the nitrogen that forms the amide bond through an aliphatic carbon of the group L or M.

Preferred linking groups are derived from alkoxy, alkylamino, phenoxy, or phenylamino radicals since these may easily be attached to the phosphazene backbone by the chemistry previously discussed. When phenoxy and phenylamino radicals are used, they must contain an alkyl group to which the reactive amino group is attached.

A more preferred embodiment comprises a linking group of the formula

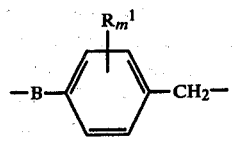

wherein
B is O or NH;
m is an integer from 0 to 4; and each $R^1$ independently represents an alkyl group containing 1 to 4 carbon atoms, a nitro group, a cyano group, or a halogen atom;
wherein B is covalently attached to a phosphorous of said phosphazene polymer and the nitrogen of the aminomethyl group of said linking group forms an amide bond with a carboxylate group of said carboxylate-containing compound.

In all of these embodiments, "primary" means having one carbon and two hydrogens bonded to the amine nitrogen and "aliphatic" means that the only other bonds to the amino carbon are single bonds to hydrogen or another carbon.

Since a primary aliphatic amino group cannot be present in an organic radical which is reacted with a reactive phosphazene backbone (i.e., having a halogen atom attached to phosphorous) without causing cross-linking, which is generally undesirable, the aliphatic amino group must be protected when it is being introduced into the polymer. Many protective groups, for example low molecular weight acyl groups such as acetyl and benzoyl, are suitable as are nitrile groups, which are preferred. When other functional groups are also present in the organic radicals, protecting groups are chosen according to the usual standards required to prevent undesired reaction of the functional groups during removal of the amine protecting groups. Acyl groups may be removed by hydrolysis in base under conditions which do not depolymerize the polymers. Nitrile groups, especially aromatic nitrile groups, are preferred since they may easily be reduced to an aminomethyl group, thereby providing the desired primary aliphatic amino group. This reduction may be carried out by any method capable of reducing the nitrile (cyano) group without depolymerizing the polymer.

A preferred method of reduction is treatment of the reaction product with $BH_3$ in an ether solvent, preferably tetrahydrofuran (THF). This reaction is preferably carried out at a temperature under 5° C. under anhydrous conditions.

The deprotected aliphatic amino group compound can be coupled to a carboxylate-containing compound by any of the known methods of forming amide bonds. One preferred technique uses the condensing reagent dicyclohexylcarbodiimide (DCC) although other condensing agents may be used if desired. When DCC is used, it is preferred to add the DCC to an ether or THF solution of the aminomethyl-containing phosphazene polymer and carboxylate-containing compound at a temperature below 5° C., followed by warming the reaction mixture to room temperature. The reaction product precipitates when this ether solution is mixed with water. The resulting carboxylated phosphazene polymer is then isolated according to standard organic chemical methods.

No restrictions are placed on the structure of the carboxylate-containing compound as long as a carboxylate group in the compound is capable of forming amide bonds. Carboxylate compounds capable of use with the present invention include simple organic acids, such as acetic and citric acid, vitamins, such as nicotinic acid, antibiotics, such as N-acetyl-DL-penicillamine, diuretics, such as p-(dipropylsulfamoyl)benzoic acid, and herbicides, such as 2,4-dichlorophenozyacetic acid.

Accordingly, carboxylated phosphazene polymers of the invention can be prepared from a wide variety of carboxylate-containing compounds and used in a wide variety of applications. Compounds which slowly release a biologically active small molecule can be prepared by attaching an active molecule containing a carboxylate group to a polymer of the invention having additional side groups selected to impart hydrolytic instability to the molecule. Such polymers, containing a small portion of linking groups of the present invention attached to active carboxylate-containing molecules, produce the active molecule in a slow release form. Biodegradable (i.e., hydrolizable) phosphazenes are discussed in detail in Allcock et al, *Inorg. Chem.* 21, 515 (1982), which is herein incorporated by reference. Active molecules may also be effective on the surface of stable solid or soluble polymers through interactions with biosystems in the immediate vicinity of the polymers.

When used in pharmaceutical or vetinary applications, the compounds of this invention can be employed in mixture with conventional excipients, i.e., pharmaceutically acceptable organic or inorganic carrier substances suitable for parenteral or entereal application which do not deleteriously react with the active compounds. Suitable pharmaceutically acceptable carriers include but are not limited to, water, salt solutions, alcohols, vegetable oils, polyethylene glycols, gelatine, lactose, amylose, magnesium stearate, talc, silicic acid, viscous parafin, perfume oil, fatty acid monoglycerides and diglycerides, pentaerythritol fatty acid esters, hydroxy methylcellulose, polyvinyl pyrrolidone, etc. The pharmaceutical preparations can be sterilized and if desired mixed with auxiliary agents, e.g., lubricants, preservatives, stabilizers, wetting agents, emulsifiers, salts for influencing osmotic pressure, buffers, coloring flavoring and/or aromatic substances and the like which do not deleteriously react with the active compounds.

For parenteral application, particularly suitable are solutions, preferably oil or aqueous solutions, as well as suspension, emulsions, or implants, including suppositories. Ampoules are convenient unit dosages.

For enteral application, particularly suitable are tablets, dragees, or capsules having talc and/or a carbohydrate carrier or binder or the like, the carrier preferably being lactose and/or corn starch and/or potato starch. A syrup, elixir or the like can be used wherein a sweetened vehicle is employed. Sustained release compositions can be formulated including those wherein the active compound is protected with differentially degradable coatings, e.g., by microencapsulation, multiple coatings, etc.

Dosage rated for known active carboxylic compounds, such as N-acetyl-DL-penicillaine, may be followed, for example, as disclosed in the 35th Edition of the Physician's Desk Reference (1981), which is herein incorporated by reference.

It will be appreciated that the actual preferred amounts of active compounds being utilized, the particular compositions formulated, the mode of application, and the particular situs and organism being treated. Optimal application rates for a given set of conditions can be ascertained by those skilled in the art using conventional dosage determination tests in view of the above guidelines.

Agricultural dosage rates (e.g., for herbicides) may likewise be determined from standard data for the carboxylate compound used or from simple experimentation.

This invention comprises both compounds of the invention as previously described and the method of attaching carboxylate compounds to a phosphazene polymer through amide linkages to aliphatic primary amino groups present in organic side chains. The overall reaction sequence comprises reacting a reactive polyhalophosphazene with a compound containing a protected amino group wherein said compound forms a radical of the formula $-ALNH_2$ or $-AMNH_2$ after conversion of the protected amino group to an amino group, where A is bonded to a phosphorous of the phosphazene backbone, and L and M were previously defined followed by coupling the amino group to a carboxylate group of a carboxylate-containing compound to give an amide bond. By reactive polyhalophosphazene is meant either a poly(dihalophosphazene) or a reaction product of a poly(dihalophosphazene) with an organic radical as previously described in which not all of the halogen atoms have been replaced.

Preferred embodiments of the synthetic method comprise forming the various preferred linking groups as previously defined. A particularly preferred embodiment comprises reacting a reactive polyhalophosphazene with a compound of the formula:

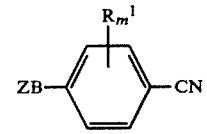

wherein B, m, and $R^1$ have the meanings previously defined and Z is H if A is NH or a metal ion, preferably an alkali metal ion, if A is O to give an intermediate product wherein A is attached directly to a phosphorous atom of the phosphazene backbone, followed sequentially b reducing the nitrile group of said intermediate product to an aminomethyl group and coupling said aminomethyl group to a carboxylate group of a carboxylate containing compound to give an amide bond. In its most preferred form, the reaction occurs with the compound

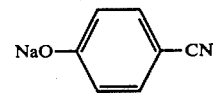

Since the intermediate products containing cyanophenyl groups are stable, they are particularly useful intermediates. Likewise, the reduced forms of these molecules, which contain aminomethylphenyl groups, are also useful intermediates. These intermediates can be prepared in bulk and then coupled to various carboxylate compounds as needed. The physical properties of the bulk intermediates (and resulting carboxylated polymers) can be easily controlled, as has been previously discussed, by selecting different organic radicals to attach at other positions of the polymer backbone. Thus, this invention also encompasses polyorganophosphazenes having organic radicals of the formula

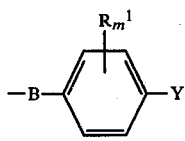

where B, m, and $R^1$ have the meanings previously defined and Y is —CN or —$CH_2NH_2$.

Having now generally describe this invention, the same will be better understood by reference to certain specific examples, which are included herein for purposes of illustration only and are not intended to be limiting of the invention or any embodiment thereof, unless specified.

EXAMPLE 1

Coupling of Phosphazene trimers to carboxylic acids

For this and the remaining examples, hexachlorocyclotriphosphazene (m.p. 110°–112° C.) was obtained from a trimer-tetramer mixture (Ethyl Corp.) after two fractional vacuum sublimations at 60° C./0.5 torr, two recrystallizations from heptane, and two additional vacuum sublimations. Phenol (Aldrich) was sublimed before use. All the other reagents were obtained from Aldrich with the exception of p-(dipropylsulfamoyl) benzoic acid (Sigma) and were used without further purification. Tetrahydrofuran (THF) and dioxane (Fisher) were distilled from sodium/benzophenone. Sodium hydride, as a 50% dispersion in oil (Alpha), was washed with dry heptane before use. All reactions were carried out under an atmosphere of dry hydrogen. A reaction scheme for all the reactions discussed in the Examples appears at the end of Example 2.

$N_3P_3(OPh)_5Cl$ (2) was prepared according to the method described in Allcock et al, *Inorg. Chem.*, 5, 450 (1966), which is herein incorporated by reference, and was recrystallized from heptane to yield white crystals, (m.p. 68°–71° C.). p-Cyanophenol (2.0 g, 0.0167 mol) was dissolved in THF (250 mL). This solution was added slowly to a suspension of sodium hydride (0.8 g, 0.0167 mol) in THF (100 mL). When the reaction was complete, the mixture was heated to 50° C. The hot solution was filtered and the filtrate was transferred to a 1000 mL capacity vessel. To this solution was added rapidly a sample of (2) (10.70 g, 0.0168 mol) dissolved in THF (150 mL). The reaction mixture was heated at reflux for 72 h. The solvent was then removed by means of a rotary evaporator, and methylene chloride (100 mL) was added to the residue. The solution was extracted twice with water (2×50 mL aliquots). The organic layer was dried with magnesium sulfate, and the solution was concentrated by means of a rotary evaporator. Addition of n-pentane produced a white precipitate of (3). Recrystallization from methanol, and/or column chromatography on silica gel with methylene chloride as eluent, yielded $N_3P_3(OPh)_5(PhCN)$ as white needles (m.p. 106°–108° C.). The $^{31}P$ NMR spectrum of this compound consisted of a singlet at +9.44 ppm. The total yield of the pure product was 62%.

$N_3P_3(OPh)_5(OPhCH)$ (5 g, 0.007 mol) was dissolved in dry THF (100 mL). The solution was cooled by means of an ice bath, and 10 mL of a 1.6 M solution of $BH_3$·THF was added via syringe techniques (equivalent to a 0.016 mol $BH_3$). The solution was allowed to warm slowly to 20° C. and was stirred at room temperature for 24 h. i-Propanol was added (CAUTION) and the THF was removed under reduced pressure. Methylene chloride was added, the resultant solution was extracted with water, and the organic layer was dried with magnesium sulfate. The solvent was then removed under reduced pressure. The resultant orange-colored oil was purified by means of chromatography on a silica (Flosil) column using methylene chloride as an initial eluent, followed by methylene chloride/ethyl acetate, and finally with elution by pure ethyl acetate. Compound (4), isolated in this way, was a pale yellow oil. The yield of purified product was 78.5% (based on 3). Structural confirmation was by mass spectrometry, $^1H$ NMR spectra, infrared spectra and microanalysis (see Table I).

$N_3P_3(OPh)_5(OC_6H_4CH_2NH_2)$ (4), (1 g, 0.0014 mol) was dissolved in dry methylene chloride (25 mL). The solution was cooled by means of an ice bath, and benzoic acid (0.34 g, 0.0028 mol) was added. Dicyclohexylcarbodiimide (DCC) (0.43 g, 0.0021 mol) was dissolved in dry methylene chloride (10 mL) and was added in one portion. A copious white precipitate formed within 1 h. The solution was allowed to warm to room temperature and was stirred for 24 h. The mixture was reduced in volume to 10 mL and was filtered through a coarse fritted funnel to remove dicyclohexylcarbodiimide urea. The solution was extracted with water, was dried with magnesium sulfate, and was evaporated to dryness to yield a yellow oil. This was purified by column chromatography on silca, using 50:50 methylene chloride/ethyl acetate as eluent, to yield (5) as an off-white oil in approximately 62% yield (yield based on (4). The $^{31}P$ NMR, $^1H$ NMR spectra and microanalytical data for this compound were consistent with the structure postulated. Other derivatives whose structures are listed in Table I were prepared in the same manner.

EXAMPLE 2

Coupling of phosphazene high polymers to carboxylic acids

The cyclic trimer, $(NPCl_2)_3$, (200 g) was polymerized in evacuated, sealed glass tubes at 250° C. for periods of 4–12 h. The tube was rocked continuously during polymerization to ensure agitation of the contents. The tube was then cooled, and residual cyclic oligomers were removed by sublimation at 55° C./0.7 torr.

Poly(dichlorophosphazene), (11 g, 0.095 mol) dissolved in dioxane (1000 mL), was added slowly to a stirred solution of sodium phenoxide prepared from phenol (11.66 g, 0.124 mol) and sodium hydride (5.96 g, 0.124 mol) in dioxane (200 mL). The ratio of reactants was designed to bring about replacement of only 66% of the chlorine by phenoxy groups. The mixture was stirred at reflux for 48 h, was cooled to 25° C., and was then treated dropwise with a solution of sodium 4-cyanophenoxide prepared previously from 4-cyanophenol (18.65 g, 0.157 mol) and sodium hydride (7.54 g, 0.157 mol) in dioxane (150 mL). The reaction mixture was stirred at reflux for 60 h, was cooled to 25° C., and was filtered to remove sodium chloride. The solvent volume was reduced to 500 mL on a rotary evaporator, and the polymer was precipitated from the residue by dropwise addition to water at 25° C. Purification was then accomplished by reprecipitation of the polymer from THF into water twice, from THF into absolute ethanol twice, and from THF into n-pentane once. The polymer was then dried in vacuo (73% yield). Characterization data are listed in Table I.

Poly(phenoxy-4-cyano-phenoxyphosphazene) (8) (5 g, 0.0067 mol) was dissolved in dry tetrahydrofuran (150 mL). The solution was cooled to 0° C. by means of an ice bath and BH₃.THF (13.4 ml, 0.0134 mols) as a 1.0 M solution in THF was added via syringe techniques. The solution was allowed to warm to room temperature and was stirred for an additional 24 h. The reaction was quenched with i-propanol (CAUTION) and the polymer was isolated by precipitation of the polymer from THF into water, from THF into absolute ethanol, and finally from THF into n-pentane. It was then dried in vacuo (yield 3.7 g, 78%).

Poly(phenoxy-4-aminoemethylenephenoxyphasphazene) (1 g, 0.0014 mol) was dissolved in dry THF (50 mL). The solution was cooled to 0° C. and N-acetylglycine (0.491 g, 0.0042 mol) was added in one portion. Dicyclohexylcarbodiimide (0.577 g, 0.0028 mol) was dissolved in THF (15 mL) and was added in one portion. The solution was allowed to warm to room temperature. This was accompanied by the formation of a white precipitate of DDC-urea. The solution was stirred at room temperature for 24 h. The product was then isolated by precipitation of the reaction mixture into water. As before, purification was by repeated precipitation from THF into water, from THF into ethanol, and finally from THF into n-pentane. Characterization data are listed in Table I (yield 80%). Other derivatives whose structures are listed in Table I were prepared in the same manner.

Summary of Characterization Data

Proton decoupled $^{31}$P NMR spectra were obtained in the FT mode at 40.5 MHz using a JEOL-PS 100-FT spectrometer equipped with a Nicholet 1080 data processing system. Infrared spectra were obtained with a Perkin-Elmer 580 spectrometer. Polymer molecular weight determinations were by gel permeation chromatography with the use of a Waters Associates ALC-201 instrument. Approximate calibration of the columns was accomplished by means of narrow molecular weight polystyrene standards obtained from Waters Associates. The Tg values of the polymer samples were measured with a Perkin Elmer DSC 20 instrument. Mass spectra were obtained for the trimeric species with the use of an AEI-MS902 mass spectrometer operating at an ionization potential of 30 eV. Elemental analyses were obtained by Galbraith Laboratories, Knoxville, Tenn.

Mass spectral parent peaks were detected for the following compounds at the m/e values given: 3 (718); 4(722); 5, where RCOOH=CH₃COOH (764),=C₂H₂COOH (778),=C₆H₅COOH (826),=CH₂=CHCOOH (777); 11 (826), 12 (821); 13 (895); 14 (989); 15 (925).

For the high polymers, the following are Tg values (°C.) and GPC molecular weights ($\times 10^{-5}$): 8 (+1.3, 4.9–5.3); 9 (+6, 4.9–5.3); 10, where RCOOH=CH₃COOH (−4,5.1–5.5), RCOOH=C₂H₅COOH (+3, 5.2–5.5), RCOOH=C₆H₅COOH (+10, 4.9–5.4), RCOOH=CH₂=CHCOOH (+19, 4.9–5.2); 11 (+8, 4.9–5.2); 12 (+27, 5.1–5.5); 13 (+12, 5.1–5.5); 14 (+17, 5.1–5.4); 15 (−2, 4.9–5.3).

The infrared spectra of the high polymers were consistent with structures 8–10. As in the case of the trimers, reduction of the cyanophenoxy unit to the aminomethyl function could be monitored by the disappearance of the characteristics sharp absorbance at 2235 cm⁻¹. All the polymers showed a characteristic P-N skeletal band at 1320–1100 cm⁻¹. The formation of the coupled products was confirmed by the appearance of a C=O absorbance near 1705 cm⁻¹.

The polymers and trimers of types 10 and 5 appeared to be hydrolytically stable at 37° C. in a buffered aqueous medium at pH 7.4. This is expected in view of the hydrophobic characters of the phenoxy cosubstituent groups. The induction of biological activity, either of the phosphazene-bound acids or the free carboxylic acids released by hydrolysis, will probably require the use of hydrophilic or hydrolytically unstable cosubstituent groups, which can be introduced by known techniques previously described.

TABLE I

Elemental Microanalysis Data

| Compound | Derived from RCOOH | | C | H | N | P |
|---|---|---|---|---|---|---|
| 3 | | c | 61.83 | 4.03 | 7.79 | 12.95 |
| | | f | 61.70 | 4.08 | 7.73 | 12.90 |
| 4 | | c | 61.50 | 4.57 | 7.76 | 12.88 |
| | | f | 61.31 | 4.70 | 7.58 | 12.69 |
| 5 | C₆H₅COOH | c | 63.92 | 4.48 | 6.77 | 11.26 |
| | | f | 63.72 | 4.68 | 6.60 | 11.15 |
| 5 | 11 | c | 62.40 | 4.35 | 8.45 | 11.24 |
| | | f | 62.80 | 4.52 | 8.10 | 11.09 |
| 8 | | c | 53.22 | 3.27 | 7.94 | — |
| | | f | 54.06 | 3.57 | 7.69 | |
| 9 | | c | 53.16 | 4.15 | 7.90 | — |
| | | f | 55.13 | 4.02 | 8.43 | |
| 10ᵃ | CH₃COOH | c | 59.14 | 4.76 | 7.51 | — |
| | | f | 56.85 | 4.40 | 8.35 | |
| " | C₂H₅COOH | c | 61.40 | 5.10 | 8.10 | — |
| | | f | 58.96 | 4.30 | 7.60 | |
| " | C₆H₅COOH | c | 64.16 | 5.01 | 7.41 | — |
| | | f | 63.29 | 6.12 | 8.29 | |
| " | 11 | c | 58.23 | 5.87 | 9.70 | — |
| | | f | 57.62 | 7.74 | 8.99 | |
| " | 12 | c | 56.02 | 4.67 | 9.80 | — |
| | | f | 55.36 | 4.07 | 6.89 | |
| " | 13 | c | 57.08 | 5.40 | 8.90 | — |
| | | f | 58.93 | 6.15 | 8.63 | |
| " | CH₂=CHCOOH | c | 55.72 | 4.09 | 7.84 | — |
| | | f | 56.54 | 4.37 | 7.37 | |
| " | 14 | c | 59.76 | 6.65 | 7.64 | — |
| | | f | 60.22 | 6.12 | 9.70 | |
| " | 15 | c | 54.59 | 4.28 | 6.26 | — |
| | | f | 54.18 | 4.96 | 7.23 | |

ᵃCalculations assume that all the polymers have the structure:
[NP(OPh)₂]ₓ[NP(OPh)(OC₆H₄CH₂NCOR)]ᵧ ₙ, where the x:y ratio is 1:2.

Scheme II
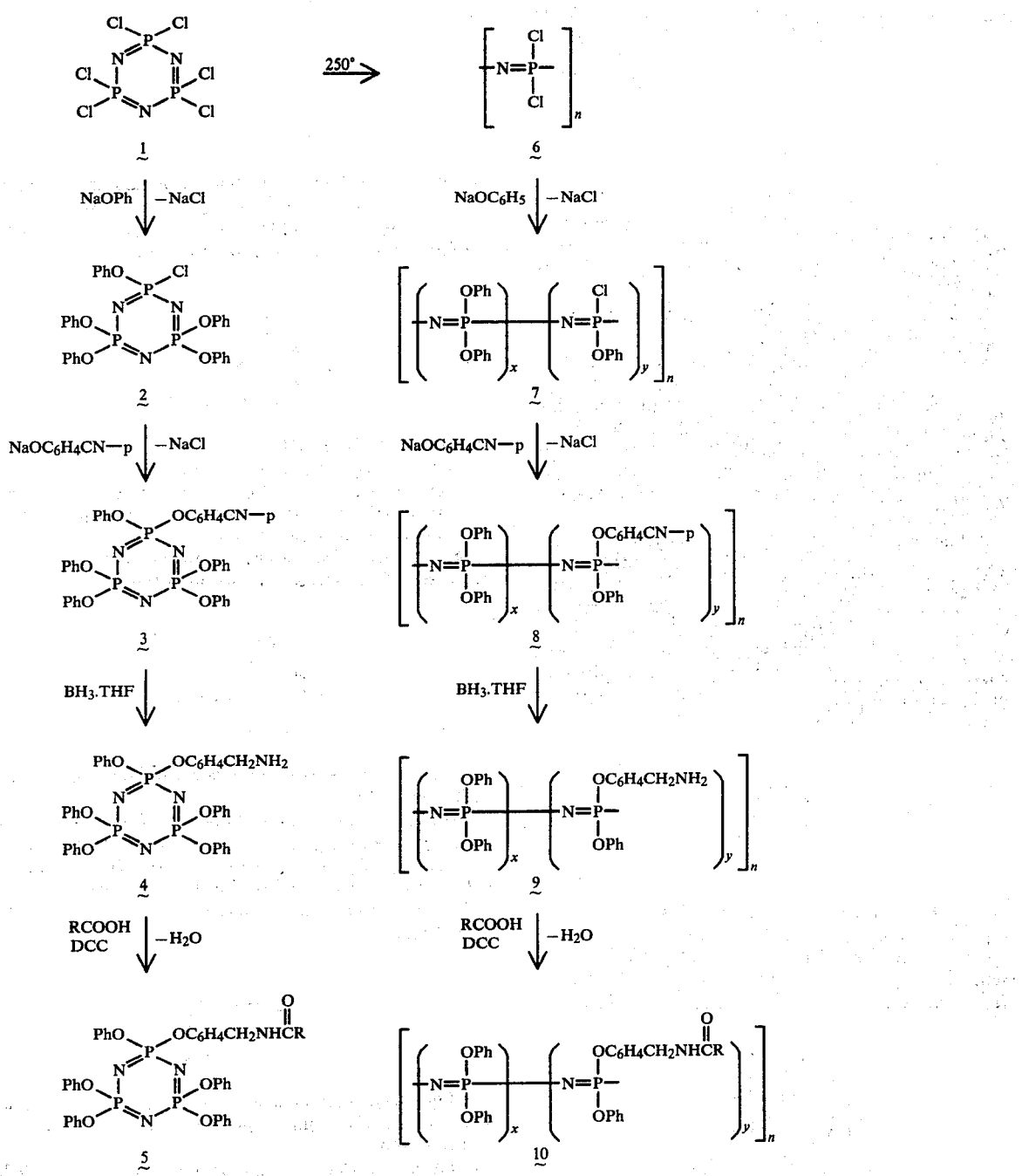
$RCO_2H = CH_3COOH, C_2H_5COOH, C_6H_5COOH, CH_2=CHCOOH$
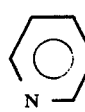—COOH    $CH_3CONHCH_2COOH$    $(CH_3)_2C(SH)CH(NHCOCH_3)COOH$
11                    12                              13

Scheme II

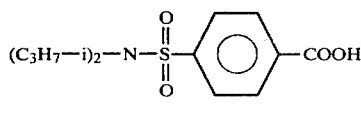

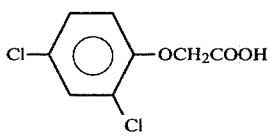

14

15

-continued

The invention now being fully described, it will be apparent to one of ordinary skill in the art that many changes and modifications can be made thereto without departing from the spirit or scope of the invention as set forth herein.

What is claimed as new and desired to be secured by Letters Patent of the United States is:

1. A carboxylated phosphazene polymer, comprising a phosphazene polymer backbone covalently coupled to a carboxylate-containing compound through a linking group attached at one end to said carboxylate-containing compound by an amide bond formed at a primary aliphatic amino group of said linking group and at the other end of said linking group to a phosphorous of said backbone.

2. The carboxylated phosphazene polymer of claim 1, wherein said linking group comprises a divalent organic radical of the formula —AL— or —AM—, wherein A represents —O— or —NH—, L represents a divalent $C_2$-$C_{12}$ alkylene group or a divalent $C_2$-$C_{12}$ alkylene group substituted by a halogen atom or —CN or said alkylene group having a divalent organic functional group of the formula —O—, —COO—, —CONR—, —RC=CR—, —C=C—,

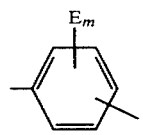

or —CO—, in the chain wherein each R independently represents hydrogen or a $C_1$-$C_4$ alkyl group, m is an integer from 0 to 4, and each E independently represents a halogen atom, —$NO_2$, —CN, or —R, and M represents a divalent aryl radical of the formula

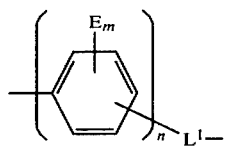

wherein n is 1 or 2, or

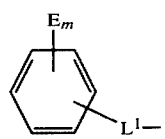

wherein $L^1$ is L or —$CH_2$—, and A is directly bonded to a phosphorous atom of said backbone, while L or M is bonded to the nitrogen that forms said amide bond through an aliphatic carbon of group L or M.

3. The carboxylated phosphazene polymer of claim 2, wherein said linking group has the formula

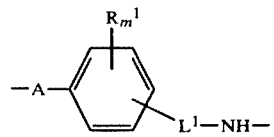

wherein A is O or NH;
m is an integer from 0 to 4; and
each $R^1$ independently represents an alkyl group containing 1 to 4 carbon atoms, a nitro group, a cyano group, or a halogen atom.

4. The carboxylated phosphazene polymer of claim 3, wherein said linking group has the formula

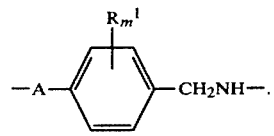

5. The carboxylated phosphazene polymer of claim 4, wherein A is O.

6. The carboxylated phosphazene polymer of claim 2, wherein organic groups of the formula —QJ are attached to phosphorous atoms of said backbone, wherein Q represent —$NR^1$— wherein $R^1$ represents hydrogen or methyl, —O—, or a covalent bond and J represents $L^1H$, MH, or

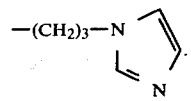

7. The carboxylated phosphazene polymer of claim 6, wherein the ratio of linking groups to organic groups is from 1:100 to 3:1.

8. The carboxylated phosphazene polymer of claim 7, wherein said ratio is from 1:10 to 1:1.

9. The carboxylated phosphazene polymer of claim 7, wherein said ratio is about 1:3.

10. The carboxylated phosphazene polymer of claim 6, wherein said linking group has the formula

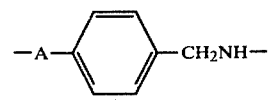

11. The carboxylated phosphazene polymer of claim 10, wherein A is O.

12. The carboxylated phosphazene polymer of claim 11, wherein the ratio of linking groups to organic groups is from 1:100 to 2:1.

13. The carboxylated phosphazene polymer of claim 6, wherein said organic groups —QJ impart water solubility to said complex.

14. The carboxylated phosphazene polymer of claim 13, wherein —QJ represent —N(CH₃)₂ or

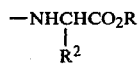

wherein R² represents a side chain of a naturally occurring amino acid.

15. The carboxylated phosphazene polymer of claim 14, wherein R² represents hydrogen.

16. The carboxylated phosphazene polymer of claim 6, wherein said organic groups —QJ impart biodegradability to said complex.

17. The carboxylated phosphazene polymer of claim 16, wherein —QJ represents

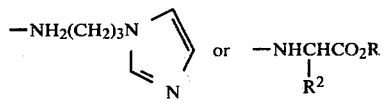

wherein R² represents a side chain of a naturally occurring amino acid.

18. The carboxylated phosphazene polymer of claim 6, wherein said organic group —QJ imparts biochemical stability to said complex.

19. The carboxylated phosphazene polymer of claim 18, wherein —QJ represents

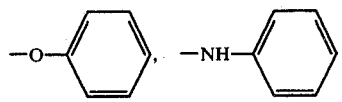

or a fluorinated C₂–C₄ alkoxyl.

20. The carboxylated phosphazene polymer of claim 19, wherein —QJ represents —OCH₂CF₃.

21. The carboxylated phosphazene polymer of claim 1, wherein said polymeric phosphazene backbone is a cyclic trimer.

22. The carboxylated phosphazene polymer of claim 1, wherein said polymeric phosphazene backbone is a linear chain containing from 3 to 30,000

repeating units.

23. The carboxylated phosphazene polymer of claim 22, wherein said backbone contains from 100 to 20,000 repeating units.

24. The carboxylated phosphazene polymer of claim 23, wherein said backbone contains about 15,000 repeating units.

25. A phosphazene polymer, comprising a phosphazene polymer backbone covalently coupled to a radical of the formula

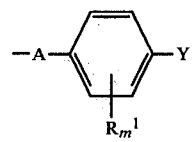

wherein
A is O or NH;
m is an integer from 0 to 4;
each R¹ independently represents an alkyl group containing 1 to 4 carbon atoms, a nitro group, a cyano group, or a halogen atom; and
Y is —CH₂NH₂ or —CN,
wherein A is covalently attached to a phosphorous of said phosphazene polymer backbone.

26. The phosphazene polymer of claim 25, wherein said radical has the formula

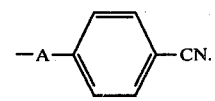

27. A method of attaching a compound having a carboxylic acid functional group to a phosphazene polymer, comprising condensing under suitable condensation conditions said compound with a polyorganophosphazene having a primary aliphatic amino group in an organic radical of said polyorganophosphazene to give an amide bond.

28. The method of claim 27, wherein said radical has the formula —ALNH₂ or —AMNH₂, wherein A represents —O— or —NH—, L represents a divalent C₂-C₁₂ alkylene group or a divalent C₂-C₁₂ alkylene group substituted by a halogen atom or —CN or said alkylene group having a divalent organic functional group of the formula —O—, —COO—, —CONR—, —RC═CR—, —C≡C—,

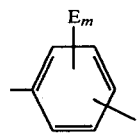

or —CO—, in the chain wherein each R independently represents hydrogen or a C₁-C₄ alkyl group, m is an integer from 0 to 4, and each E independently represents a halogen atom, —NO₂, —CN, or —R, and M represents a divalent aryl radical of the formula

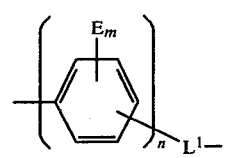

wherein n is 1 or 2, or

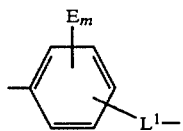

wherein L¹ is L or —CH₂—, and A is directly bonded to a phosphorous atom of said backbone, while L or M is bonded to the nitrogen that forms said amide bond through an aliphatic carbon of group L or M.

29. The method of claim 27, wherein said radical has the formula

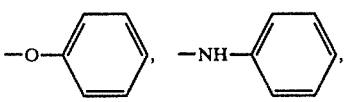

30. The method of claim 29, wherein m is zero.
31. The method of claim 29, wherein A is O.
32. The carboxylated phosphazene polymer of claim 11, wherein QJ represents or a flourinated $C_2$–$C_4$ alkoxyl.

* * * * *

UNITED STATES PATENT AND TRADEMARK OFFICE
CERTIFICATE OF CORRECTION

PATENT NO.    : 4,440,921
DATED         : April 3, 1984
INVENTOR(S)   : Harry B. Allcock, et al.

It is certified that error appears in the above-identified patent and that said Letters Patent are hereby corrected as shown below:

ON THE COVER PAGE:

[73] Assignee: "Research Corporation, Tucson, Ariz." should read as --Research Corporation, New York, New York--.

IN THE SPECIFICATION:

Column 2, line 45, "or" should read as --on--.

Column 9, line 60, in the formula, "$R_m^1$" should read as --$R^1_m$--.

Column 12, line 28, in the formula, "$R_m^1$" should read as --$R^1_m$--.

Column 13, line 2, in the formula, "$R_m^1$" should read as --$R^1_m$--.

Column 14, line 9, "(4)" should read as --($\underline{4}$)--.

Column 14, line 30, "(5)" should read as --($\underline{5}$)--.

Column 14, line 31, "(4)" should read as --($\underline{4}$)--.

Column 16, line 18, "5" should read as --$\underline{5}$--.

UNITED STATES PATENT AND TRADEMARK OFFICE
CERTIFICATE OF CORRECTION

PATENT NO. : 4,440,921

DATED : April 3, 1984

INVENTOR(S) : Harry B. Allcock, et al.

It is certified that error appears in the above-identified patent and that said Letters Patent are hereby corrected as shown below:

IN THE CLAIMS:

Column 20, line 19, in the formula, "$R_m^1$" should read as --$R^1_m$--.

Column 20, line 33, in the formula, "$R_m^1$" should read as --$R^1_m$--.

Column 22, line 10, in the formula, "$R_m^1$" should read as --$R^1_m$--.

Signed and Sealed this

Second Day of April 1985

[SEAL]

Attest:

DONALD J. QUIGG

Attesting Officer

Acting Commissioner of Patents and Trademarks